United States Patent
Frank et al.

(10) Patent No.: US 11,502,568 B2
(45) Date of Patent: Nov. 15, 2022

(54) STATOR WINDING WITH INCREASED POWER DENSITY

(71) Applicant: Rolls-Royce Deutschland Ltd & Co KG, Blankenfeld-Mahlow (DE)

(72) Inventors: Michael Frank, Uttenreuth (DE); Jörn Grundmann, Großenseebach (DE); Markus Wilke, Erlangen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 240 days.

(21) Appl. No.: 16/762,128

(22) PCT Filed: Sep. 21, 2018

(86) PCT No.: PCT/EP2018/075555
§ 371 (c)(1),
(2) Date: May 6, 2020

(87) PCT Pub. No.: WO2019/091652
PCT Pub. Date: May 16, 2019

(65) Prior Publication Data
US 2020/0366148 A1  Nov. 19, 2020

(30) Foreign Application Priority Data
Nov. 7, 2017 (DE) ...................... 10 2017 219 735.8

(51) Int. Cl.
*H02K 3/28* (2006.01)
*H02K 3/24* (2006.01)
(Continued)

(52) U.S. Cl.
CPC ................. *H02K 3/28* (2013.01); *H02K 3/24* (2013.01); *H02K 3/47* (2013.01); *H02K 55/04* (2013.01); *H02K 3/487* (2013.01); *H02K 55/02* (2013.01)

(58) Field of Classification Search
CPC .. H02K 3/24; H02K 3/28; H02K 3/47; H02K 3/487; H02K 55/00; H02K 55/02; H02K 55/04
(Continued)

(56) References Cited

U.S. PATENT DOCUMENTS

| 4,135,107 A | * | 1/1979 | Kamerbeek | ............... H02K 3/04 310/179 |
| 4,200,817 A | * | 4/1980 | Bratoljic | ................ H02K 55/04 310/201 |

(Continued)

FOREIGN PATENT DOCUMENTS

| CN | 205992807 U | 3/2017 |
| DE | 2522626 A1 | 12/1975 |

(Continued)

OTHER PUBLICATIONS

German Search Report for German Application No. 10 2017 219 735.8 dated Sep. 26, 2018.
(Continued)

*Primary Examiner* — Rashad H Johnson
(74) *Attorney, Agent, or Firm* — Lempia Summerfield Katz LLC (57) ABSTRACT

A stator for an electric alternating current machine includes a stator winding arranged about a central axis and including conductor windings. The conductor windings are grouped to form electrical phases. The stator winding has winding layers. The conductor windings of a phase each have axially oriented conductor limbs that are connected to one another in two axial end regions in pairs by two winding heads. Individual coils are thus formed for each phase. As viewed in a circumferential direction, the axial conductor limbs of the individual phases follow one another in alternation in a uniform order. The winding heads of a given individual coil extend within a winding layer. A sequence of the axial
(Continued)

conductor limbs of the respective phases and the distribution of the individual coils on the individual winding layers are chosen to avoid crossovers within the individual winding layers in the region of the winding heads.

18 Claims, 8 Drawing Sheets

(51) Int. Cl.
  *H02K 3/47* (2006.01)
  *H02K 55/04* (2006.01)
  *H02K 55/02* (2006.01)
  *H02K 3/487* (2006.01)

(58) Field of Classification Search
  USPC .................. 310/65, 179, 208, 264, 265, 266
  See application file for complete search history.

(56) References Cited

U.S. PATENT DOCUMENTS

| | | | | |
|---|---|---|---|---|
| 4,292,558 A * | 9/1981 | Flick | ........................ | H02K 3/47 310/194 |
| 4,924,125 A * | 5/1990 | Clark | ........................ | H02K 1/02 310/67 R |
| 5,493,157 A * | 2/1996 | Nakamura | .............. | H02K 29/03 310/67 R |
| 5,723,933 A * | 3/1998 | Grundl | .................... | H02K 29/06 310/266 |
| 5,744,888 A * | 4/1998 | Zajc | ........................ | H02K 29/06 310/216.057 |
| 6,894,418 B2 * | 5/2005 | Jones | ........................ | H02K 3/04 310/179 |
| 7,986,063 B2 * | 7/2011 | Nakamura | .............. | H02K 23/26 310/40 MM |
| 8,362,669 B2 * | 1/2013 | Suzuki | ............... | H02K 15/0442 310/184 |
| 8,803,398 B2 * | 8/2014 | Takeuchi | ................ | H02K 15/12 310/180 |
| 8,847,458 B2 * | 9/2014 | Le Besnerais | ........... | H02K 3/12 310/201 |
| 9,337,695 B2 * | 5/2016 | Clark | .................... | H02K 15/063 |
| 9,685,830 B2 * | 6/2017 | Kasper | ...................... | H02K 3/47 |
| 2004/0021391 A1 * | 2/2004 | Jones | ........................ | H02K 3/04 310/184 |
| 2007/0145852 A1 * | 6/2007 | Schon | ........................ | H02K 3/12 310/201 |
| 2007/0176509 A1 * | 8/2007 | Kalsi | ........................ | H02K 9/19 310/179 |
| 2009/0108695 A1 * | 4/2009 | Scott | ........................ | H02K 3/04 310/208 |
| 2010/0164319 A1 * | 7/2010 | Metsberg | ................. | H02K 3/18 29/596 |
| 2010/0225193 A1 * | 9/2010 | Clark | ................... | H02K 15/063 310/208 |
| 2010/0277136 A1 | 11/2010 | Snitchler | | |
| 2010/0295385 A1 * | 11/2010 | Hsu | ........................ | H02K 41/03 310/12.22 |
| 2011/0291532 A1 * | 12/2011 | Takeuchi | ................ | B60L 58/40 310/68 B |
| 2012/0161568 A1 * | 6/2012 | Umemoto | ................ | H02K 3/47 310/198 |
| 2012/0217827 A1 * | 8/2012 | Takeuchi | ................ | H02K 3/30 310/154.02 |
| 2012/0293035 A1 * | 11/2012 | Nakamura | ............. | H02K 21/14 310/208 |
| 2012/0306310 A1 * | 12/2012 | Takeuchi | ............. | H02K 15/066 29/596 |
| 2013/0082560 A1 * | 4/2013 | Takeuchi | ................ | B60L 50/20 310/156.01 |
| 2014/0077648 A1 * | 3/2014 | Brauer | ..................... | H02K 3/26 310/152 |
| 2019/0363596 A1 * | 11/2019 | Takeuchi | ............. | H02K 15/066 |
| 2019/0363597 A1 * | 11/2019 | Takeuchi | ................ | H02K 3/04 |
| 2020/0366148 A1 * | 11/2020 | Frank | ........................ | H02K 1/20 |
| 2021/0143694 A1 * | 5/2021 | Arndt | ........................ | H02K 3/24 |
| 2021/0265885 A1 * | 8/2021 | Takahashi | ............ | H02K 1/2786 |
| 2021/0367465 A1 * | 11/2021 | Takahashi | .............. | H02K 1/278 |
| 2021/0367494 A1 * | 11/2021 | Takahashi | ............ | H02K 15/022 |
| 2021/0384784 A1 * | 12/2021 | Takahashi | .............. | H02K 21/22 |
| 2021/0384794 A1 * | 12/2021 | Tamura | .................. | H02K 3/522 |
| 2022/0021261 A1 * | 1/2022 | Naderer | ................ | H02K 9/193 |

FOREIGN PATENT DOCUMENTS

| | | |
|---|---|---|
| DE | 102005002214 A1 | 7/2006 |
| DE | 102016113436 A1 | 1/2018 |
| DE | 102016221810 A1 | 5/2018 |

OTHER PUBLICATIONS

International Search Report and the Written Opinion for International Patent Application PCT/EP2018/075555 dated May 16, 2019.

* cited by examiner

STATOR WINDING WITH INCREASED POWER DENSITY

This application is the National Stage of International Application No. PCT/EP2018/075555, filed Sep. 21, 2018, which claims the benefit of German Patent Application No. 10 2017 219 735.8, filed Nov. 7, 2017. The entire contents of these documents are hereby incorporated herein by reference.

BACKGROUND

The present embodiments relate to a stator for an electric alternating current machine.

According to the prior art, typical stator windings are usually embodied as distributed, nonskewed windings in which a plurality of axially oriented conductor limbs that make up a substantial part, which is effective for electrical induction, of the winding are present. These axial conductor limbs are frequently distributed on a plurality of winding layers and are typically arranged in slots of an iron yoke. These rectilinear portions are then connected in axial end regions by winding heads, with the rectilinear portions of the individual windings being bridged in the circumferential direction by the winding heads. A change between the individual winding layers may take place. A disadvantage with such a conventional geometry is that these winding heads make a high weight contribution to the overall weight of the stator and are difficult to cool and also difficult to manufacture. The winding heads also have a high space requirement (e.g., in the axial direction), which increases the structural volume of the electric machine overall and thus also makes a relatively large housing necessary. Particularly extensive winding heads are often present if the bending radii of the conductors present cannot be chosen to be particularly small and/or if many conductors have to be led past one another with a large winding step (e.g., a large circumferential region to be bridged by the winding head). The thickness of the conductor insulation and possibly present cooling ducts for cooling the winding may also contribute to a large space requirement for the winding heads. The electrical losses of a machine having large winding heads are also disadvantageously high, since there is the presence here of a large fraction of conductor material that is not used for induction but, however, contributes to ohmic conduction losses. In order to achieve a machine with high power density, it is therefore generally advantageous to configure the winding heads to be as compact as possible.

It has been shown that optimization of the power density of a machine solely based on two-dimensional considerations (e.g., without taking account of the three-dimensional configuration of the winding heads) frequently results in design forms with correspondingly large diameters and a correspondingly short axial length. However, precisely in the case of short axial overall lengths and large diameters, two unfavorable effects occur in conjunction with the winding heads: the winding heads then contribute to an above-average degree to the total conductor quantity of the stator, and the contribution to the torque, as compared with the rectilinear, axial part of the winding, is particularly low. Consequently, the large winding heads have a particularly negative effect both on the mass balance and on the power loss balance. Also linked with the large winding heads is a large winding head leakage inductance, which has further negative effects on the electromagnetic behavior of the machine.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a stator for an electric alternating current machine that overcomes the aforementioned disadvantages is provided. For example, a stator having a stator winding in which a space requirement of the winding heads (e.g., in an axial direction) is as small as possible is provided. In this way, an increased power density may be achieved. As another example, an electric machine having a stator improved in such a way is provided.

The stator according to the present embodiments is configured as a stator for an electric alternating current machine. The stator includes a stator winding arranged about a central axis and including a plurality of conductor windings. The plurality of conductor windings are grouped to form a plurality n of electrical phases. The stator winding has a plurality m of winding layers. The conductor windings of a phase each have a plurality i of axially oriented conductor limbs that are connected to one another in two axial end regions in pairs by, in each case, two winding heads, with the result that a plurality k of individual coils are formed for each phase. As viewed in the circumferential direction, the axial conductor limbs of the individual phases follow one another overall in alternation, specifically in a uniform order. The two winding heads of a given individual coil extend within a common winding layer. Both the sequence of the axial conductor limbs of the respective phases and the distribution of the individual coils on the individual winding layers are chosen such that crossovers within the individual winding layers are avoided in the region of the winding heads.

In other words, the stator winding is, for example, not configured as a distributed winding in the conventional sense (e.g., in which frequently each winding group is produced by winding an extended conductor "in one piece" over many axial limbs and many winding heads). Instead, the stator winding is composed of a plurality of individual coils in a similar manner to a lap winding or tooth coil winding. Each phase includes a plurality of such individual coils that are, for example, electrically connected to one another to form a winding group. These discrete individual coils may be present, for example, as prefabricated components that are only subsequently electrically connected to one another. The presence of discrete individual coils within each winding group makes it possible, in conjunction with the remainder of the features according to the present embodiments, to achieve a particularly compact configuration of the winding heads. For a given individual coil, both winding heads are to extend within a common winding layer. This is also intended to provide that each winding head also does not leave the corresponding predetermined winding layer. By contrast, with typical distributed windings according to the prior art, no layer change between the conductor branches to be connected is thus brought about in the region of the winding heads.

The number n of the phases may, for example, be three or an integral multiple of three.

The feature "as viewed in the circumferential direction, the axial conductor limbs of the individual phases follow one another in alternation in a uniform order" may be that, for different successive azimuthal angles (e.g., over the entire circumference of the stator), a fixed pattern of phase occupancies periodically follows one another. For example, the construction may be such that, in the axially inner machine region in which the axial conductor limbs are arranged, at most one phase is represented by one or more associated conductor limbs for each predetermined angle. In one embodiment, where appropriate, azimuthal gaps may be present between these occupied positions. With a run-through of the successive azimuthal angles in the circumferential direction, the occupancy with individual phases then changes in a predetermined, recurring order. However, a given phase is not limited to a certain winding layer, but the conductor limbs of the respective phase may be distributed on a plurality of layers in a given azimuthal position and/or the occupancy of the layers may, for a given phase, change back and forth at different azimuthal angles between different layers.

In principle, however, a plurality of phases (e.g., overlapping from different layers) are also represented for some azimuthal angles. Such overlapping regions may, for example, alternate with other azimuthal regions in which, as described above, in each case only one phase is represented. In such a case, however, with an azimuthal overlapping of the phases, the order of the occupancy of the angular positions with the individual phases may change in a regularly recurring pattern. Layer changes between the individual coils of a phase are not intended to be ruled out within the recurring pattern of phase occupancies, as will become even clearer in conjunction with the later examples.

Crossovers in the region of the winding heads are avoided within a respective predetermined winding layer. In other words, the individual coils are, within each winding layer, arranged next to one another at assigned azimuthal positions and do not penetrate or overlap one another within the respective layer. An overlapping of the individual coils (e.g., as viewed in radial projection) results in each case only when a plurality of winding layers situated over one another are considered together. This is achieved, for example, by virtue of the fact that, within a given winding layer, the region between the two axial conductor limbs of a given individual coil is not filled by the axial conductor limbs of other individual coils. In order nevertheless to achieve a frequent change between the axial conductor limbs of the individual phases in the azimuthal direction, an overlapping between individual coils of different phases is instead provided over different layers. In other words, the individual coils that, according to the above-described azimuthal occupancy scheme, would cross with a given individual coil are switched to another radial winding layer. This provides that conductor crossings within a layer are avoided, and nevertheless, overall, the occupancy of azimuthal positions with individual phases changes more frequently than the occupancy of the individual phases within a layer.

The described avoidance of crossovers within a winding layer affords the additional advantage that the winding heads may be configured to be very compact, for example, in the axial direction, since no additional axial length has to be provided therefore in order for conductor branches of different phases to be led three-dimensionally past one another within a winding layer. As a result, the winding heads within the respectively assigned layer may be configured with a comparatively tight bending radius and a comparatively short axial length of the winding head. As a result, the machine overall may be configured to be comparatively compact, and, for example, axially short, which allows a comparatively high power density of the machine.

The electric machine is an alternating current machine having a stator according to the present embodiments. The advantages of the machine according to the present embodiments result analogously to the above-specified advantages of the stator according to the present embodiments.

The described embodiments of the stator and of the electric machine may generally be combined with one another.

According to an embodiment, all individual coils are each situated completely within a winding layer respectively assigned thereto. In other words, a change of the winding layer is thus avoided not only in the region of the winding heads but also in the region of the entire individual coil. This may apply, for example, to all individual coils of the stator winding. Such an embodiment is generally suitable for achieving a compact winding construction with an as simple as possible construction of the individual coils. Crossings and superimpositions of conductor branches in a layer are avoided overall since, in each winding layer, only the individual coils clearly assigned thereto in each case are arranged next to one another in the circumferential direction. The individual coils may each be configured as saddle coils; in other words, the individual coils may, at least in subregions, be curved out of a flat coil plane. These saddle-shaped coils may, for example, be shaped such that the saddle-shaped coils are in each case adapted to the contours of a cylinder segment. For example, the saddle-shaped coils may in each case be shaped such that the saddle-shaped coils are situated between two concentric circular hollow cylinders. The region between these two hollow cylinders then defines the corresponding winding layer, which is in the form of the lateral surface of a cylinder, with a corresponding radial layer thickness.

In this general embodiment, for each selected individual coil that is situated in an assigned winding layer, an axial limb of this individual coil, as viewed in radial projection, overlaps with an inner region of another individual coil. This other individual coil is arranged in another winding layer. The inner region of an individual coil (e.g., the region which is situated between two axial limbs) may also be referred to as "eye" of a coil. In one embodiment, the eye of each individual coil may also overlap with at least one axial limb from another winding layer. This type of overlapping (e.g., as viewed again in radial projection) may achieve a situation in which a complex winding topology with a complex zone sequence (e.g., a frequent change of the occupancy of the azimuthal positions with individual phases) may be achieved with simultaneous avoidance of conductor crossings within a winding layer.

In one embodiment, the stator winding may be configured as an air gap winding. Such an air gap winding is thus not embedded in slots of an iron core or of another soft magnetic material. Instead, the air gap winding is arranged in the air gap region of the machine. Such air gap windings in the stator are advantageous when the magnetic fields generated during the operation of the machine are of such strength that saturation of the soft magnetic, flux-carrying stator material would occur in a conventionally designed machine. This may be the case in conjunction with superconducting rotor windings. A further advantage of the use of stator windings configured as air gap windings is that the space and the weight contribution of a conventional flux-carrying structure are saved. The omission of the soft magnetic teeth between the axial conductor limbs thus makes it possible to achieve a higher filling factor of the winding.

The configuration as an air gap winding may be provided, since the described "displacement" of overlappings between individual coils to different winding layers results in filling factor being forfeited. This occurs by unoccupied positions being present in each winding layer as a result of the shifting of the overlapping to other winding layers. In a conventional stator winding in which the axial limbs are embedded in slots between iron teeth, this may lead to an overall very low filling factor of the stator winding, thereby in turn negatively influencing the overall power density of the machine. In an air gap winding, however, the space loss due to the soft magnetic teeth does not arise, and in spite of the unoccupied positions of the axial conductor limbs, the filling factor may thus still be sufficiently high. In the configuration as an air gap winding, the stator winding may have supporting structures that extend in the radial direction in a similar manner to the conventional stator teeth and are arranged azimuthally between the individual axial limbs of the winding. Such supporting structures may extend radially over a plurality of winding layers and thus support the entire winding. In the configuration as an air gap winding, such supporting structures are correspondingly formed from nonmagnetic material.

As an alternative to the aforementioned embodiment as an air gap winding, it is, however, also possible for the described radial supporting structures to be formed from soft magnetic material; therefore, the radial supporting structures may be able to act as teeth of a stator yoke. Such teeth are, however, only very narrow teeth that are configured to be considerably narrower in the circumferential direction than conventional stator teeth. In one embodiment, such "minimal stator teeth" have a width in the azimuthal direction that is substantially less than the azimuthal width of the individual axial conductor limbs. For example, the width of the stator teeth may be, for example, at most a fifth or at most a tenth of the width of the individual conductor limbs. The specified maximum widths may also apply analogously to the supporting structures of nonmagnetic material described above.

However, according to an alternative embodiment, there are no supporting structures or teeth present that extend in the radial direction over a plurality of winding layers. This embodiment is advantageous in conjunction with the configuration of the individual coils as flat saddle coils, which, by virtue of the flat shape, may be readily stacked over one another in a plurality of winding layers without having to be particularly supported by teeth situated therebetween. The unoccupied positions of the individual winding layers may optionally be filled by other flat fitting structures.

In general, the packing density (e.g., the filling factor) is reduced by the presence of unoccupied positions in the winding, which leads, for example, to a lower power density than with a higher filling factor. However, the axial extent of the winding heads by comparison with the prior art is considerably reduced by the features of the present embodiments. It is thus possible overall for a machine that nevertheless has a higher power density than a machine according to the prior art to be made available.

In general, the axial limbs of the individual coils may be distributed over a regular occupancy pattern of radial and azimuthal positions. In other words, a regular two-dimensional pattern that may be represented as an arrangement of occupied and unoccupied positions in polar coordinates may be provided. The occupied positions are occupied in a characteristic arrangement by the axial limbs of the individual phases. Such an occupied position extends over, for example, the entire axial region of the stator winding. The axial region of the stator winding is situated between the two end winding head regions. The regular occupancy pattern may provide that the pattern of the occupancy positions for the individual phases results as a pattern of occupied and unoccupied positions, with this pattern being based on a regular grid of radial positions (e.g., winding layers) and azimuthal positions. This pattern may (e.g., as a whole) have a symmetry. For example, the pattern may be repeated in the circumferential direction after a specified angle; in other words, a rotational symmetry is then present. A twofold rotational symmetry may be provided, with the result that a rotation through 180° converts the occupancy pattern into itself. A higher-fold rotational symmetry (e.g., with an even or odd number) may also be provided. A mirror symmetry does not necessarily have to be present. It may be advantageous, for example, for a twofold and/or higher-fold rotational symmetry to be present without a plane of symmetry existing for the occupancy pattern.

The regular occupancy pattern may have a plurality of unoccupied positions. In other words, gaps are present in the regular grid (e.g., individual positions of the grid with azimuthal and radial coordinates that are not occupied by an axial limb of an individual coil). Such gaps may result by virtue of the fact that, as viewed in radial projection, the eyes of certain individual coils are superimposed with the longitudinal limbs of other individual coils, but that, as described above, penetration of the coils is avoided by switching to other winding layers. This switching necessarily results in gaps in the occupancy pattern. For example, each of the winding layers may have one or more such gaps. Alternatively or additionally, one or more gaps may also be present for each azimuthal position of the grid. This configuration is advantageous, for example, in the case of an unchorded winding. In such an unchorded winding, it is possible, for example, for the fraction of the unoccupied positions to be 50% or even higher still in order to be able to avoid the spatial overlapping of the individual coils within a winding layer. For example, the fraction of the unoccupied positions for a phase number of n=3 may be 50%. For higher phase numbers, the fraction of the unoccupied positions may be even greater. As a result, the filling factor of the winding is also then, where appropriate, only at most 50%, since further losses in the filling factor (e.g., due to supporting structures) may be added. In the case of a chorded winding, the loss of filling factor due to the unoccupied positions may be even less than 50%, since the width of the individual zones in relation to the width of the gap situated between the individual zones may be increased there.

In each case, one or more coolant ducts may be arranged in the region of the described unoccupied positions. Such coolant ducts may be used to effectively cool the stator winding with a fluid coolant that flows through the coolant ducts. This is, for example, the case in machines with particularly high power densities for which the present embodiments may be relevant. In electric machines with very high power densities, the winding may be cooled by incorporating cooling ducts between the individual conductor limbs. In order to not accept additional losses in the filling factor of the winding, the unoccupied positions may be used for such cooling ducts. In the configuration of the individual coils as flat coils, such an arrangement is advantageous, since a given individual coil may in each case be cooled by at least one coolant duct that is arranged in an adjacent winding layer. The flat configuration of the coils, and the correspondingly analogously flat geometry of the respectively unoccupied positions, then results in a correspondingly high contact area and a short distance between the given coil and the unoccupied space in the adjacent layer that may be used by one or more coolant ducts. There thus results a correspondingly good heat transfer between individual coils and coolant.

The stator winding may have, for example, an even number m of winding layers that may, for example, be m=2 or m=4. With such an even number of winding layers, the stator winding may be structured into belonging-together pairs of winding layers, where, for a given azimuthal position, for example, always one winding layer is occupied and the other winding layer of the same pair is unoccupied. Thus, the above-described switching of mutually overlapping individual coils to different winding layers is achieved, and overall, half of the present positions remains unoccupied. The belonging-together pairs of winding layers do not necessarily have to be arranged radially adjacently. In an analogous manner, it is alternatively also possible that four winding layers always belong together to form a group and that correspondingly, for each azimuthal position, only one layer of this group is occupied.

The winding heads of the individual coils may each be of approximately U-shaped configuration. Such a shape may not only be a U shape in the strict sense (e.g., the connection of two axial limbs by a semicircular bow) but also any other shape by which two parallel axial limbs are connected to one another by an overall rounded-off connecting region. This connecting region may, for example, also have a connecting limb that is connected to the axial limbs via two rounded-off corners. Such a connecting limb may (e.g., like the semicircular bow) be curved overall such that the connecting limb reproduces the contours of a winding layer in the form of the lateral surface of a cylinder and thus comes to lie within such a layer.

In general, the U-shaped configuration may provide that the winding heads have overall a particularly short axial extent. The smallest radius of curvature of the conductor that occurs in the region of a winding head may, for example, be below 500 mm, below 100 mm, or below 10 mm (e.g., in a range between 1 mm and 50 mm). Such low radii of curvature are generally made possible in a stator winding according to the present embodiments by virtue of the fact that penetration and overlappings of individual coils within a layer are avoided, and consequently, the individual conductors do not have to be led past one another through extensive conductor paths in the winding heads. By contrast, what is concerned in each winding head is only a connection of two axial conductor limbs that are arranged within a common winding layer and are led adjacently (e.g., not spaced apart by conductor limbs of other phases) to one another in this winding layer. In this winding topology, the bending radius in the region of the winding heads is limited downwardly only by the bending properties of the conductors and not by the penetration, which is to be avoided, of the winding heads, as in the prior art. The conductors may be, for example, stranded conductors having individual strands that consist of copper or at least include copper. Such a stranded conductor makes it possible to achieve comparatively small minimum bending radii that, for example, may be approximately three times the conductor width present within the plane of curvature.

The individual coils may each be configured as saddle-shaped flat coils. A flat coil may be a coil in which the width of the conductor limbs within the respective winding layer is substantially greater than the height of the conductor limbs (e.g., the thickness thereof perpendicular to the local orientation of the winding layer). The width of the conductor limbs may, for example, be at least twice as much or at least five times as much as the height of the conductor limbs. The formation of the individual coils as flat coils is generally advantageous in order, in conjunction with the described distribution of the winding on a plurality of winding layers and the specific arrangement in which a crossover within the layers is avoided by unoccupied positions, to achieve a mechanically stable winding assembly. Such a winding assembly may be configured to be mechanically stable even without stator teeth or other radial supporting structures. For this purpose, the positions of the grid that are not occupied by conductor branches may, for example, be filled by correspondingly shaped other structures in order to provide additional mechanical retention. These filling structures may, for example, be configured to be nonconductive and/or may optionally include coolant ducts. In general, the flat shape of the coils is also electromagnetically advantageous, since a distributed winding having a number of holes greater than 1 may thus be reproduced. By contrast thereto, a winding having coils configured to be narrow in the azimuthal direction and high in the radial direction behaves rather like a concentrated winding with a number of holes of one and would have a disadvantageously high content of harmonic winding components.

In general, the stator winding may be configured, for example, as an unchorded winding. In the case of such an unchorded winding, a "pure zone scheme," in which the circumference of the stator winding is subdivided into individual azimuthal regions ("zones") that are each occupied only with conductor limbs of a selected phase, and additionally have the unoccupied gaps, may be maintained. However, no superimposition of conductor limbs of different phases within a given circumferential position is, for example, present. It is possible in the case of such an unchorded winding, according to the remainder of the features of the present embodiments, for a novel stator winding that corresponds in zone plan to a zone plan of a conventional stator winding in the slots of stator teeth to be made available.

As an alternative to the preceding embodiment, the stator winding may also be configured as a chorded winding. A chording of the winding may be achieved, for example, by an offset in the circumferential direction between the individual winding layers. In other words, conductor limbs that are situated over one another but belong to a common phase of different winding layers may be slightly offset from one another azimuthally. Such a "slight offset" may be chosen to be smaller than the smallest azimuthal distance between axial conductor limbs situated next to one another within a winding layer. However, alternatively or additionally to such an azimuthal offset, a chording may also be achieved by virtue of the zones of a winding layer that are situated next to one another azimuthally being chosen to have different widths. In this embodiment, it is also possible, for example, for the unoccupied positions to be configured with a smaller width than the occupied positions, which, by contrast with an unchorded winding, allows a slightly improved filling factor.

Within the stator winding, the individual coils of a respective phase may be electrically connected to one another in one or both axial end regions to form a superordinate winding group. Such an electrical connection may be realized, for example, via a connector ring.

The stator may be configured such that an axial length (e.g., including the winding heads) is shorter than an outside diameter of the stator. For example, the ratio between axial length and outside diameter may be even less than 0.4. Such an aspect ratio is facilitated by the winding topology according to the present embodiments and, under certain circumstances, made possible since only with the avoidance of extensive winding heads may a correspondingly short stator be realized.

In addition to the stator described, the electric machine may also have a rotor that is configured to generate a magnetic field having p poles. The advantages described for the stator according to the present embodiments are provided in conjunction with such a rotor.

For example, such a rotor may be equipped with a superconducting excitation winding. Such a configuration is particularly advantageous in order to achieve a very high power density with the machine. The electric machine is configured for a nominal power of at least 2 MW (e.g., even at least 5 MW). Alternatively or additionally, the electric machine may have a power density of, for example, at least 10 kW/kg or at least 20 kW/kg. This is relevant for, for example, generators or motors in vehicles that have to be concomitantly moved when such a vehicle is being driven. Critical is the power density in electric machines in aircraft. Irrespective of the precise application of the machine, the electric machine may generally be operated either as a motor and/or as a generator. The machine may be configured as a synchronous machine.

The magnetic pole number p of the electric machine may be between two and twelve (e.g., between six and twelve; precisely eight). Such a configuration is advantageous in order to achieve a high power density. The range results from, for example, the radial air gap field and thus the induced voltage decreasing with increasing pole number and the electrical frequency for the same rotational speed increasing with increasing pole number. The second effect increases the induced voltage, resulting overall with typical geometries in an optimum for the power within the stated ranges. In addition, there are also further effects, for example that, in the case of small pole numbers, a relatively large yoke thickness is to be selected, which influences the weight. Such factors also determine the preferred pole number range for an optimal power density.

DETAILED DESCRIPTION

Figure 1:
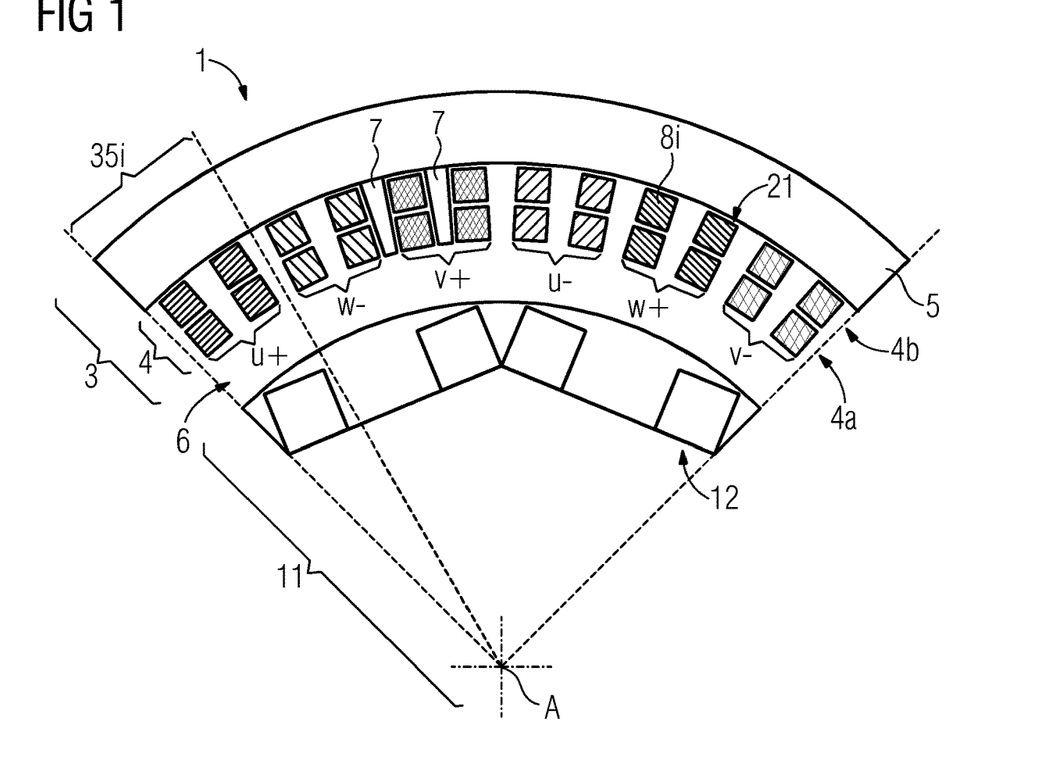
FIG. 1 shows a schematic sectional illustration of part of an electric machine according to the prior art.

In the figures, same or functionally same elements are provided with the same reference signs. FIG. 1 shows a detail of an electric machine 1 according to the prior art in schematic cross section. FIG. 1 shows a 90° angle segment in a section plane that is situated perpendicular to a central axis A of the electric machine 1. The electric machine 1 has an inner rotor 11 that is mounted so as to be rotatable about the central axis A. The inner rotor 11 is equipped with a plurality of field windings 12, of which two poles are shown in FIG. 1 by way of example. The plurality of field windings 12 serve to form an excitation field of the electric machine 1. The inner rotor 11 (e.g., a rotor) is surrounded radially by a fixed stator 3. Both the inner rotor 11 and the fixed stator 3 have, for example, a circular cylindrical basic shape. The fixed stator 3 includes an outer iron yoke 5 in the form of a lateral surface of a cylinder as a flux-carrying element. An air gap 6 is situated between the iron yoke 5 and the rotor 11. A stator winding 4 of the fixed stator 3 is arranged in the air gap 6. An air gap winding is not arranged azimuthally between magnetic structures. The stator winding 4 includes a plurality of windings $8i$, of which the illustrated detail shows 24 pieces in the form of axially extending conductor limbs. In order to provide the stator winding 4 with mechanical retention, the axial conductor limbs may optionally be embedded between nonmagnetic teeth 7 (or some other retaining structures), of which two are shown in a central part of the drawing by way of example. The stator winding 4 of FIG. 1 has two winding layers 4a and 4b over which the individual axial conductor limbs 21 are distributed. The two winding layers 4a and 4b are a radially inner lower layer 4a and a radially outer upper layer 4b. The stator winding 4 of FIG. 1 has a total of three electrical phases u, v and w that are associated, for example, with the three phases of a three-phase alternating current machine. The conductor branches of a respective phase are electrically connected to one another to form a superordinate winding group. Within such a winding group, regions of different current flow direction alternate with one another as viewed over a circumference of the stator winding 4. The stator winding of FIG. 1 is an unchorded winding in which, as viewed in the circumferential direction, different azimuthal positions $35i$ follow one another. Each of these positions is only assigned in each case to a certain phase and a predetermined current flow direction. Thus, for example, the conductor limbs designated together by +u form the outgoing conductors of the electrical phase u. The conductor limbs designated together by −u form the return conductors of the electrical phase u for the respectively assigned azimuthal position. The zone scheme of the electric machine specifies the characteristic pattern in which the outgoing conductors and return conductors of the individual phases are distributed over the grid of the azimuthal positions and of the winding layers.

Figure 2:
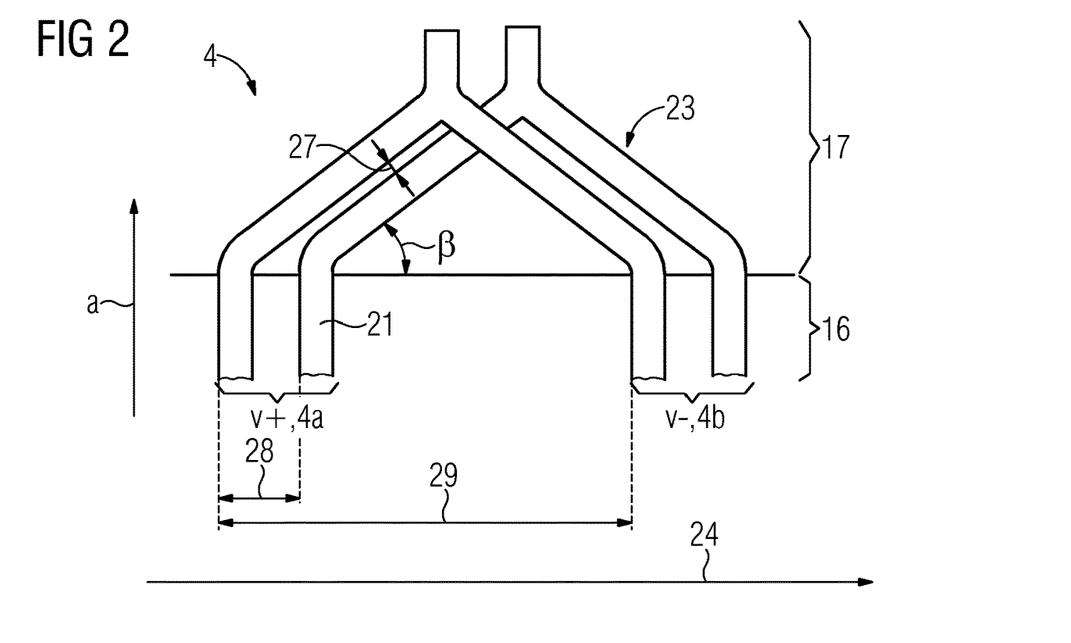
FIG. 2 shows an illustration of part of a stator winding from the electric machine of FIG. 1.

FIG. 2 shows a schematic illustration of part of the stator winding 4 from the machine of FIG. 1. The illustration of FIG. 2 is a simplified two-dimensional illustration of the winding in which the winding, which is actually circular cylindrical, has been conceptually "unrolled" onto a planar plane. This plane is correspondingly defined by the two direction coordinates of the axial direction a and of the angle coordinate 24. Not only components that lie exactly in the paper plane are illustrated here. Rather, what is concerned is a projection that illustrates components from the two winding layers 4a and 4b. The illustrated part of the winding 4 includes two outgoing conductors of the phase v that are correspondingly designated by +v. Also shown are two return conductors of the same phase that are correspondingly designated by −v. The two outgoing conductors are situated in the lower layer 4a, and the two return conductors are situated in the upper layer 4b. Along the angle coordinates 24, both the two adjacent outgoing conductors and the two adjacent return conductors are in each case offset with respect to one another by slot pitch 28. In other words, both the two adjacent outgoing conductors and the two adjacent return conductors are situated in adjacent slots. The axial conductor limbs shown (e.g., the outgoing conductors and return conductors) are situated in an axially inner part 16 of the winding, of which only a small portion is shown. Adjoining this is an axial end region 17 in which the conductor limbs belonging to one another are electrically connected to one another via winding heads 23. The winding heads 23 also bridge the layer spacing. The winding step 29 to be bridged by this connection is six times the slot pitch 28 in this example. In order to avoid a spatial penetration of the winding heads 23 in spite of this relatively large azimuthal spacing and in spite of the crossover, which is visible in this projection, of adjacent conductor branches, a relatively large angle β is to be provided. In the example shown, the minimum necessary angle β is also increased by virtue of the fact that an insulation spacing 27 between the individual conductors is to be observed in the region of the winding heads 23. As a result of the described geometric boundary conditions, however, the axial length of the winding heads 23 is also very large corresponding to the size of the angle β. By virtue of this effect, in conventional machines, a large part of the axial length and also of the weight of the machine is accounted for by the winding heads, which, however, contribute very little to the field utilization of the machine.

Figure 3:
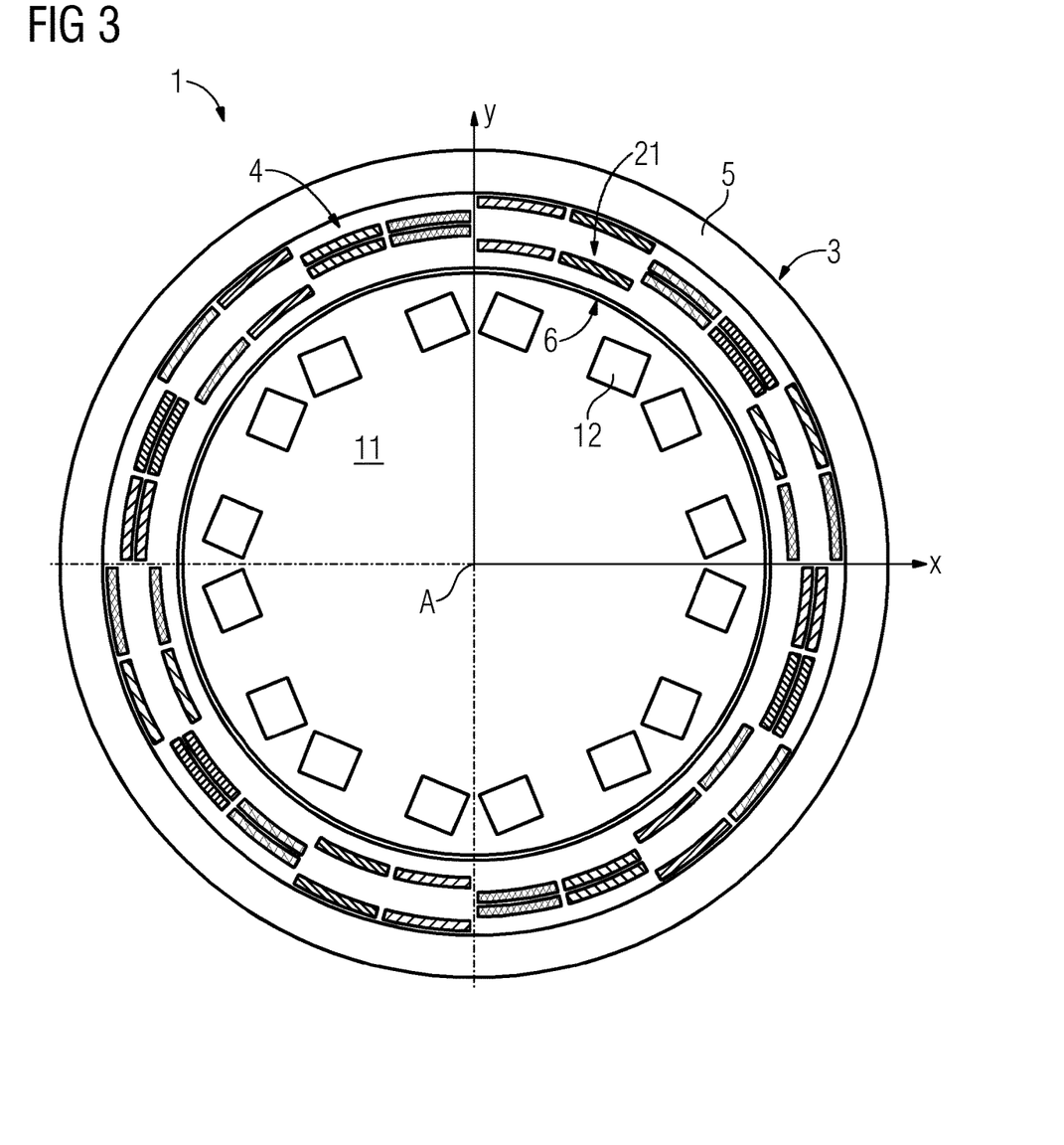
FIG. 3 shows a schematic sectional illustration of part of an electric machine according to a first exemplary embodiment.
Figure 4:
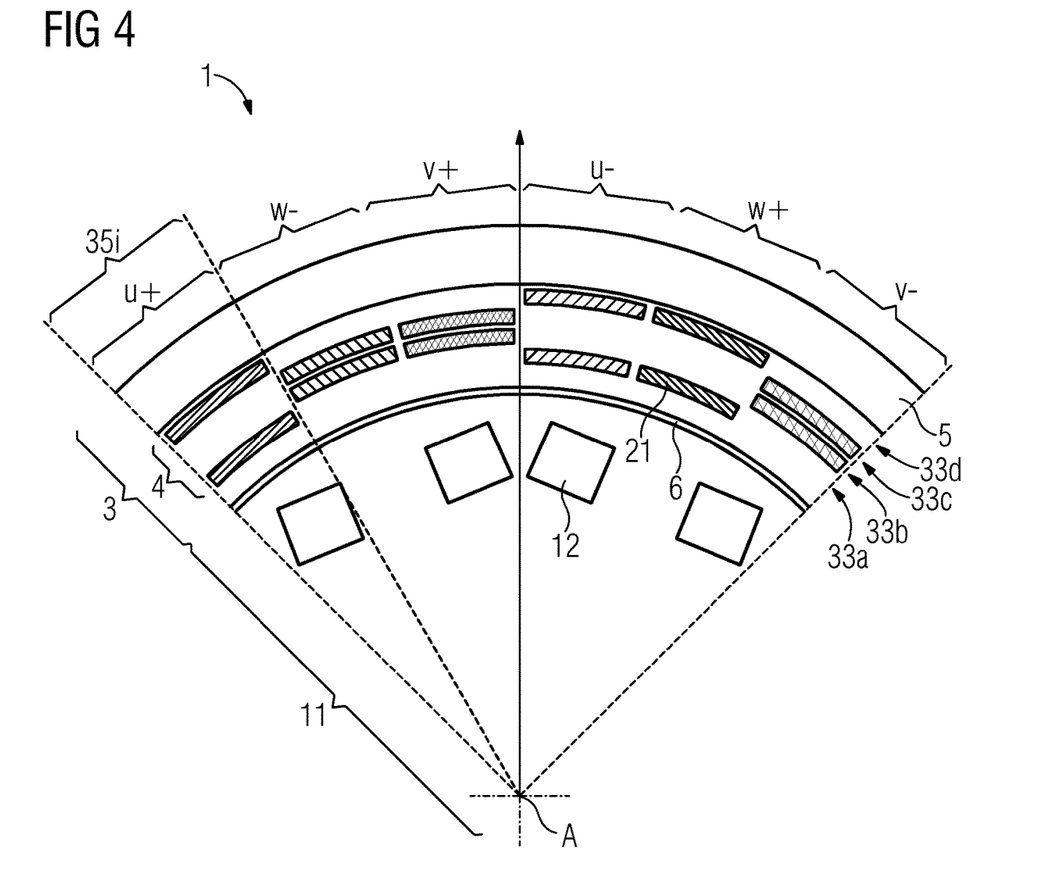
FIG. 4 shows a detail of an angle segment of the electric machine of FIG. 3.

FIG. 3 shows a schematic cross section through an electric machine 1 according to a first exemplary embodiment. Also shown is a section perpendicular to the central axis A of the machine. The electric machine 1 also has an inner rotor 11 and, surrounding the inner rotor 11 radially, a stator 3. The inner rotor 11 may be configured in a similar manner to the rotor of the conventional machine of FIG. 1. The inner rotor 11 may, for example, as illustrated, be configured to form an eight-pole electromagnetic excitation field. The electric machine of FIG. 3 also has an outer stator yoke 5 that is in the form of a lateral surface of a cylinder and which radially surrounds the stator winding 4 in the region shown as a flux-carrying element. The illustrated region is an axially inner part of the winding 4 (e.g., the region in which the axially extending conductor limbs 21 of the winding are arranged). The winding heads 23 are arranged in the axially outer regions (not shown here) and connect the individual conductor limbs of the individual phases to form superordinate winding groups. The assignment of the individual axial conductor limbs 21 to individual winding layers and to azimuthal positions is illustrated in more detail in FIG. 4, which again shows only a 90° detail of the machine. The stator winding 4 according to this first exemplary embodiment has 4 winding layers 33a, 33b, 33c and 33d over which the individual axial conductor limbs 21 are distributed according to a regular pattern. In a similar manner to the machine of FIG. 1, the stator winding 4 is divided into three electrical phases u, v and w. In this machine, too, the stator winding 4 is divided into a grid of discrete azimuthal positions 35i, where each of the discrete azimuthal positions 35i is assigned to one of the three electrical phases u, v or w and is, for example, assigned either to the outgoing conductors +u, +v or +w or to the return conductors −u, −v or −w of the respective phase. In the example of FIGS. 3 and 4, as viewed in the circumferential direction, the three phases alternate with one another in an always recurring order (e.g., always u, v, w, u, v, w, and so on). The zone plan is thus analogous to the winding of FIG. 1. For the subset of the azimuthal positions that are occupied with a given phase (e.g., u), the outgoing conductors (+u) always alternate in this example with the return conductors (−u) in a recurring pattern. In the present embodiments, by contrast with the winding of FIG. 1, this stator winding is not configured as a distributed winding but is composed of individual coils. In each case, two axial limbs of a given phase are connected to one another via two winding heads (e.g., situated in the axial end regions, which are not illustrated) to form an annular individual coil. In the example shown, each of these individual coils is arranged in only one assigned winding layer (e.g., only in 33a, 33b, 33c or 33d). Both the axial conductor limbs and the winding heads of each individual coil are thus situated within this assigned layer. The two axial conductor limbs that belong to an individual coil are not situated in adjacent azimuthal positions of the winding. In the detail of FIG. 4, in each case, the illustrated outgoing conductor +u is connected to the illustrated return conductor −u, for example, within the innermost layer 33a and also within the outermost layer 33d to form a common individual coil. However, as viewed from the outgoing conductor +u, the return conductor −u is situated only in the next but two azimuthal position. Two azimuthal positions that are occupied with other conductor branches +v and +w are situated between the outgoing conductor +u and the return conductor −u. In order to avoid crossovers between the individual coils, and hence a penetration of the conductors and/or complex, extensive winding heads, the individual coils of the conductor phases +v and +w situated therebetween switch to other winding layers (e.g., to the layers 33b and 33c). The shown axial conductor limbs +v and +w situated therebetween are in each case connected within a corresponding winding layer to associated return conductors −v (e.g., on the left of the illustrated angle segment) and −w (e.g., in the right part of the illustrated detail) again to form individual coils that, within their winding layer, have no penetration or crossover with other individual coils.

Figure 5:
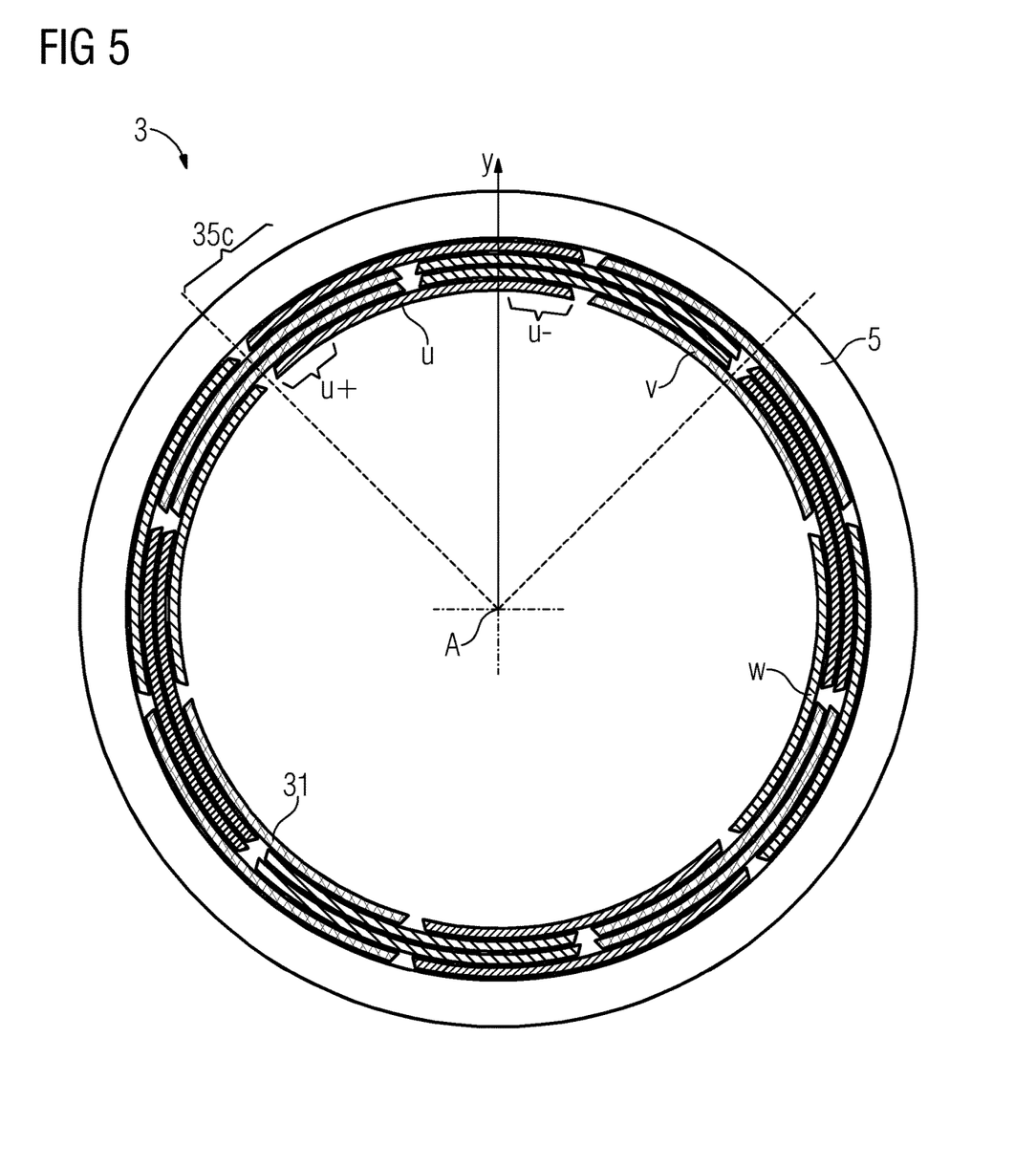
FIG. 5 shows an axial plan view of the stator of the electric machine of FIG. 3.

In order to illustrate the exact arrangement of the individual coils in the first exemplary embodiment and, for example, the avoidance of crossovers by switching to other winding layers, FIG. 5 shows an axial plan view of the stator in one of the axial end regions. A section through a region in which the winding heads of the individual coils extend and, in each case, connect to one another the longitudinal limbs that are assigned to one another is thus illustrated. The individual coils are configured as flat coils 31 that each lie only within one of the four winding layers. The correspondence of these individual flat coils 31 to the 3 electrical phases u, v and w is denoted by different hatching. For better comparison with the detail of FIG. 4 (e.g., in the axially inner cross section), the angle segment illustrated there is denoted by radial lines. The azimuthal position denoted by way of example by the reference sign 35i is also the same as in FIG. 4. In order to further facilitate the comparison, for the radially inner individual coil that is denoted by the reference sign u, the axial conductor limbs situated therebehind in the axial direction are also marked with the corresponding reference signs +u and −u.

As shown in FIGS. 3 and 5, the occupancy pattern of the azimuthal positions and of the winding layers for this example has a twofold symmetry. In other words, the pattern may be converted into itself by a rotation through 180°. However, no mirror symmetry is present for this example.

Figure 6:
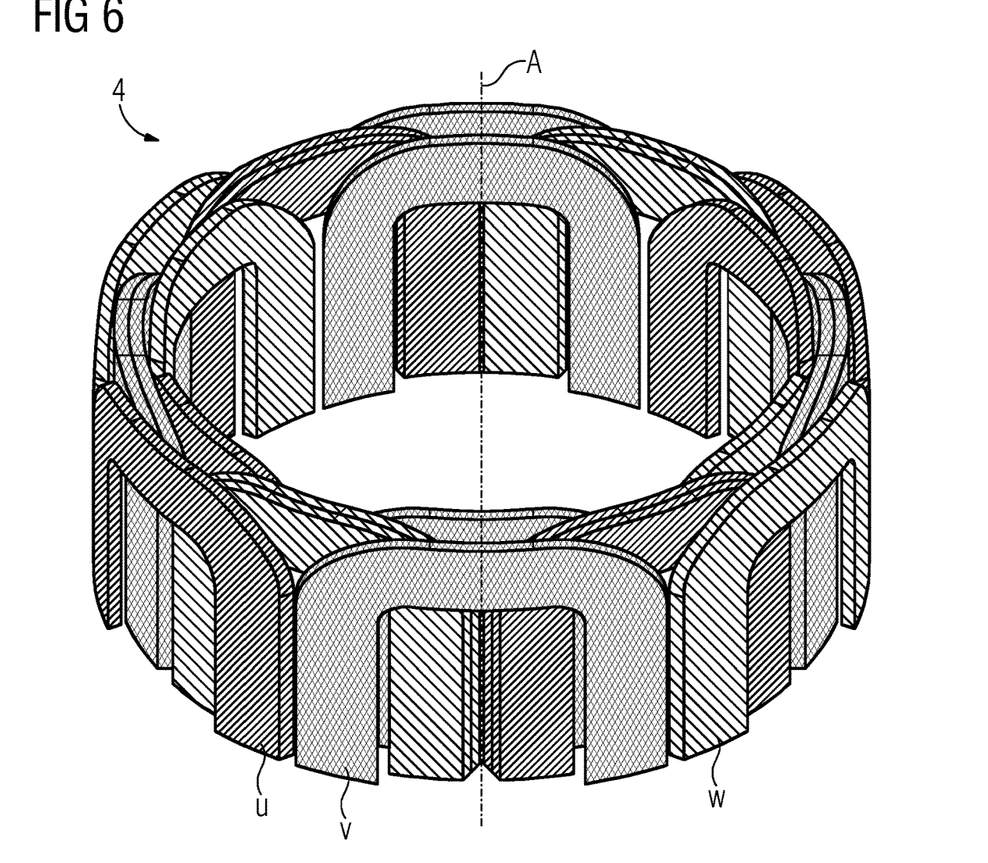
FIG. 6 shows a three-dimensional schematic illustration of part of the electric machine of FIG. 3.

For better illustration of the winding geometry, FIG. 6 also shows a schematic three-dimensional illustration of the same stator winding 4 as is shown in the sectional illustrations of FIGS. 3, 4 and 5. For the sake of clarity, what is shown is only a half of the winding, which has thus been bisected perpendicularly to the axis. As shown, the individual coils 31 are configured as saddle-shaped flat coils that are adapted to the geometry of the respective winding layer that is in the form of the lateral surface of a cylinder. A geometric overlapping of these individual saddle coils results by virtue of the specific arrangement only in radial projection, but not within the respectively considered layer.

Figure 7:
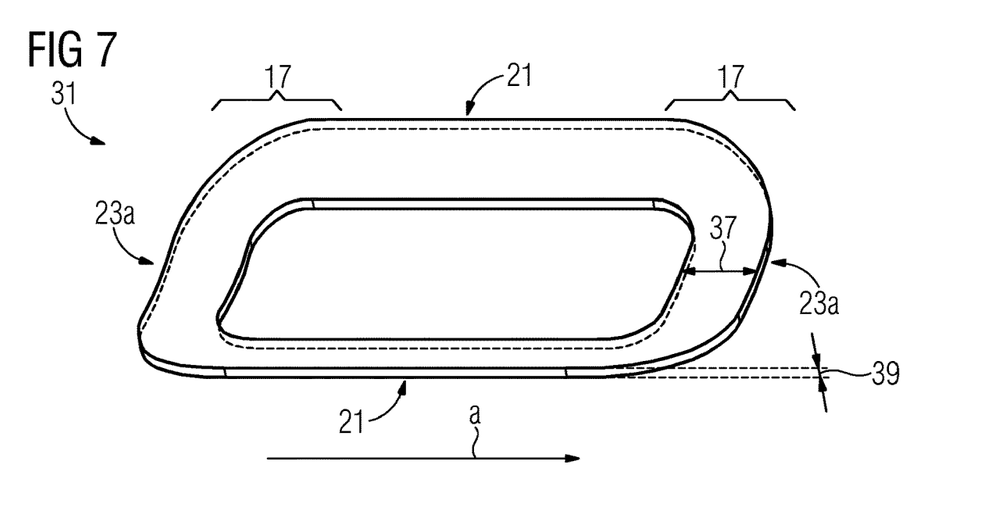
FIG. 7 shows a three-dimensional schematic illustration of one embodiment of an individual saddle-shaped flat coil.

FIG. 7 shows a schematic three-dimensional illustration of an individual saddle-shaped flat coil 31. The flat coil 31 is not planar overall, but the flat coil 31 is adapted to a contour of a corresponding winding layer that is in the form of the lateral surface of a cylinder. The flat coil 31 includes two axially extending conductor limbs 21 that are connected to one another in the two axial end regions 17 by winding heads 23a. All these conductor portions have a flat cross-sectional shape in which a width 37 of the conductor limbs is in each case greater than a thickness 39 of the conductor limbs (e.g., the thickness in the direction of the thickness of the winding layer). Contrary to the impression that may arise from the perspective distortion of FIG. 7, the cross section both in size and shape is intended to be uniform for all limbs of the individual coil.

Figure 8:
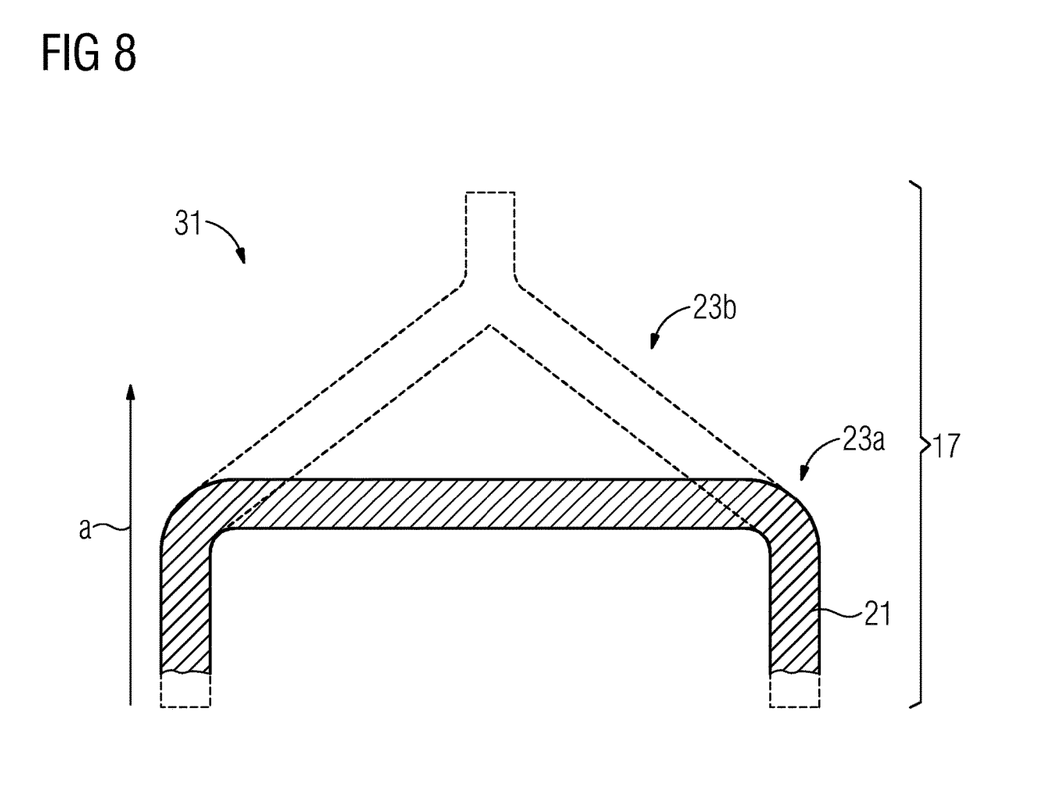
FIG. 8 shows a projection of part of a flat coil by comparison with the projection of a conventional stator winding.

FIG. 8 shows a projection of part of a flat coil 31, as may be used in a stator according to the present embodiments, in an illustration analogous to FIG. 2. The axial end region 17 of the flat coil 31 (e.g., the region in which the two axial conductor limbs 21 of such a coil transition into the associated winding head 23a) is shown. For the flat coil of FIG. 8, an even more extreme U-shaped configuration of the winding head 23a compared to the flat coil of FIG. 7 is shown. In the example of FIG. 8, the central limb of the U shape has a relatively long rectilinear region that is flanked by two rounded-off corners. Such a configuration is not necessary, but may be advantageous to keep the extent of the winding head in the axial direction particularly small. The corresponding shortening of the axial length of the winding head thus makes it possible to achieve a shortening of the axial length of the machine overall, which leads to a particularly high power density. In order to illustrate this shortening of the axial length, the axial extent of a conventional winding head 23b from a distributed winding (similarly as in FIGS. 1 and 2) is illustrated by dashed lines in FIG. 8.

Figure 9:
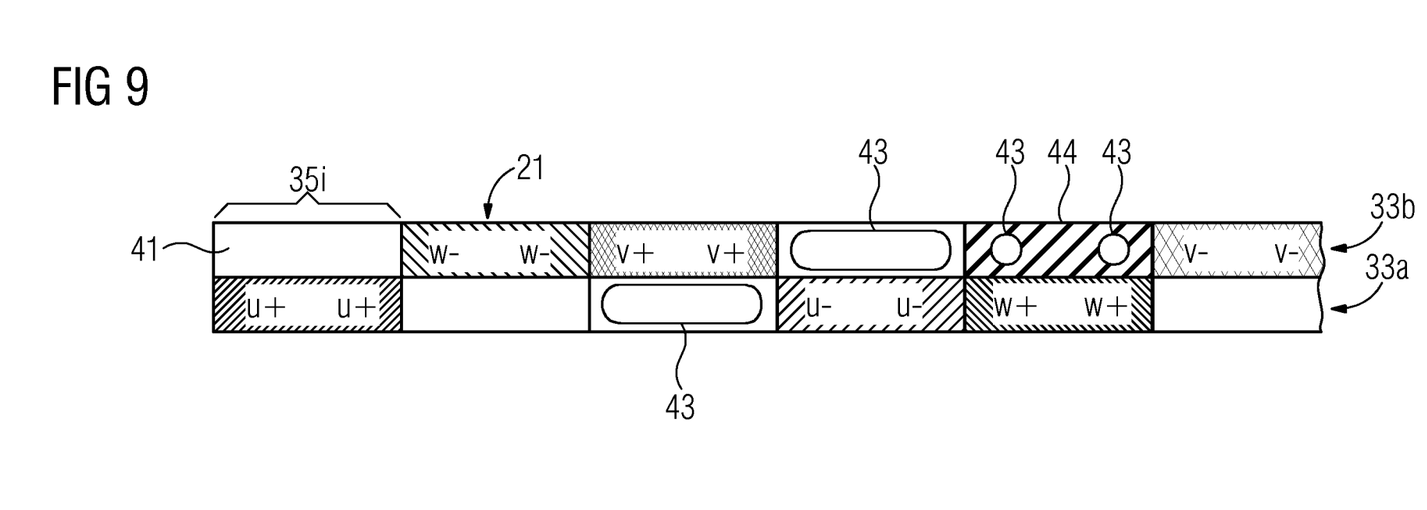
FIG. 9 shows a detail of a winding scheme of a stator winding according to a second exemplary embodiment.

FIG. 9 shows a detail of a winding scheme of a stator winding according to a second exemplary embodiment. Such a winding scheme shows the occupancy of the individual azimuthal positions 35i and of the individual winding layers of the stator winding, which is in the form of the lateral surface of a cylinder, in "unrolled" form. FIG. 9, however, does not show the full winding scheme for the machine according to the second exemplary embodiment, but only a 90° detail corresponding to FIG. 4. By contrast with the example of FIG. 4, the winding scheme of FIG. 9 has only two winding layers 33a and 33b. However, apart from the absence of the two outer layers 33c and 33d, the winding scheme of FIG. 9 corresponds to the winding scheme of FIG. 4. The same is also correspondingly intended to apply to the continuation of the detail illustrated of the winding scheme. In the schematic illustration of the example of FIG. 9, only half of the positions are occupied with axial conductor limbs 21 of the individual phases u, v and w. Unoccupied positions 41 are present at the other places of the grid, which, by comparison with a densest packing of axial conductor limbs, leads to a loss of filling factor of the winding. However, by comparison with a conventional winding according to FIG. 1, it is advantageous that the stable stacking of flat coils provides that there is no need for radial retaining teeth 7, or at most very narrow teeth, between the axial conductor limbs. Thus, the loss of filling factor due to the unoccupied positions 41 may be compensated for at least in part by the saving on radial retaining structures. The unoccupied positions 41 may be used for other functional structures. Thus, the corresponding space may be used, for example, for the arrangement of flat cooling ducts 43, with in each case such a cooling duct being situated radially adjacent to an occupied position (e.g., to an axial conductor limb 21). Alternatively, a plurality of such cooling ducts 43 may be routed within an unoccupied position 41. FIG. 9 shows, by way of example, only a few individual cooling ducts 43. Alternatively or additionally to the arrangement of cooling ducts, the unoccupied positions may, however, also be filled with other flat filling elements 44, of which one is shown in FIG. 9 by way of example. Such filling elements may also be traversed by individual cooling ducts 43.

Figure 10:
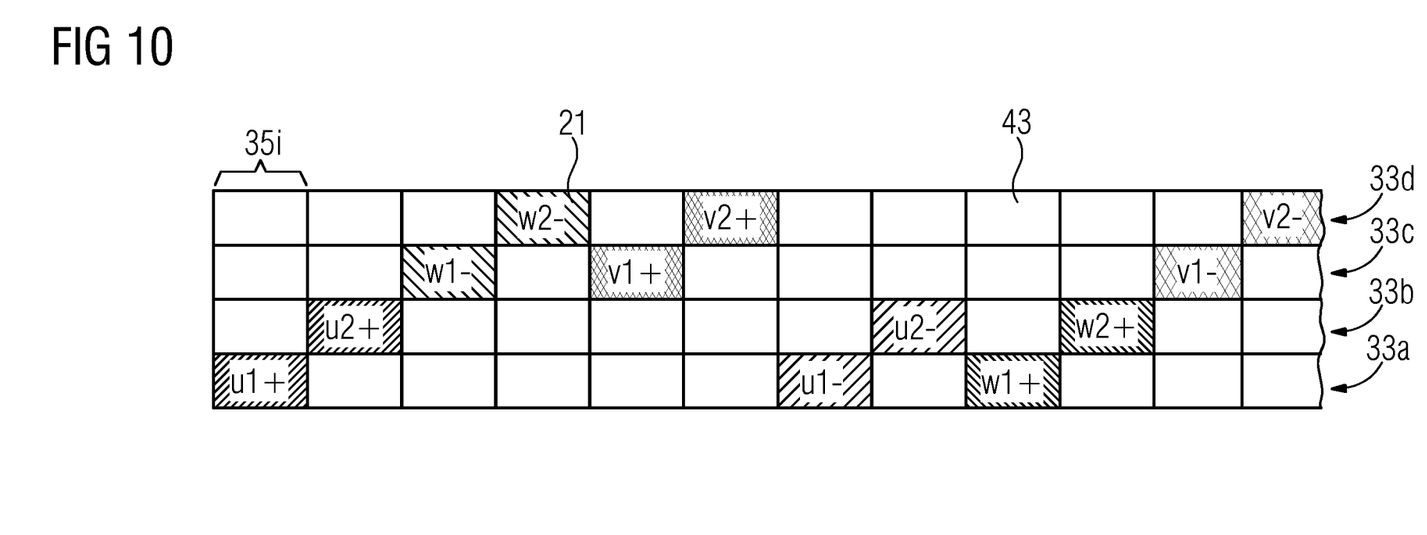
FIG. 10 shows a detail of a winding scheme of a stator winding according to a third exemplary embodiment.
Figure 11:
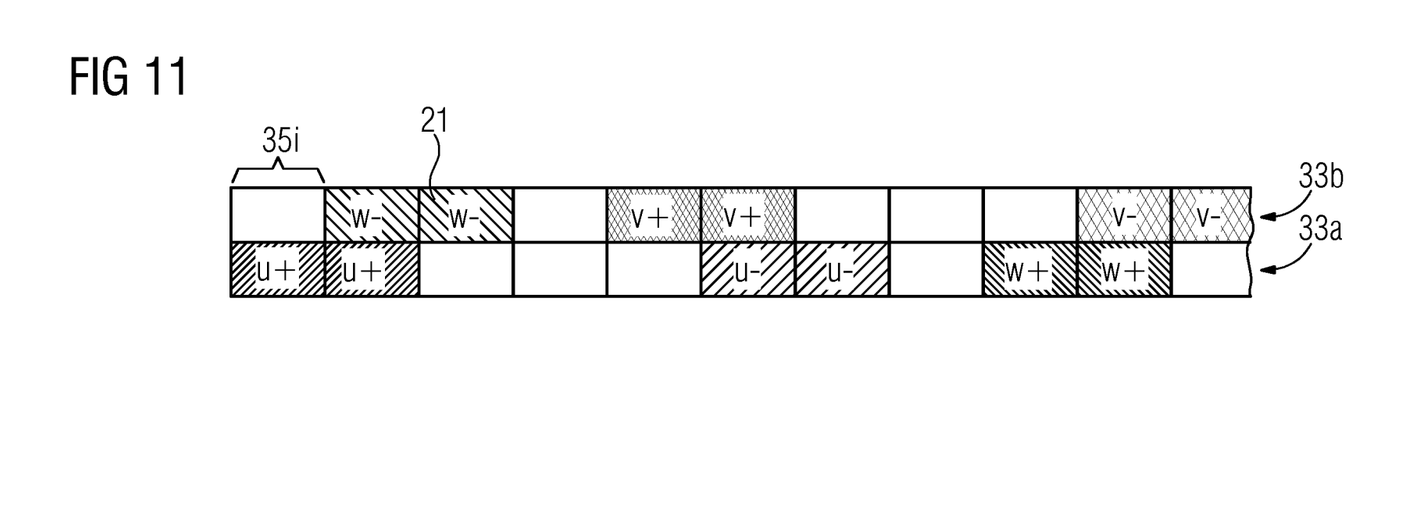
FIG. 11 shows a detail of a winding scheme of a stator winding according to a fourth exemplary embodiment.
Figure 12:
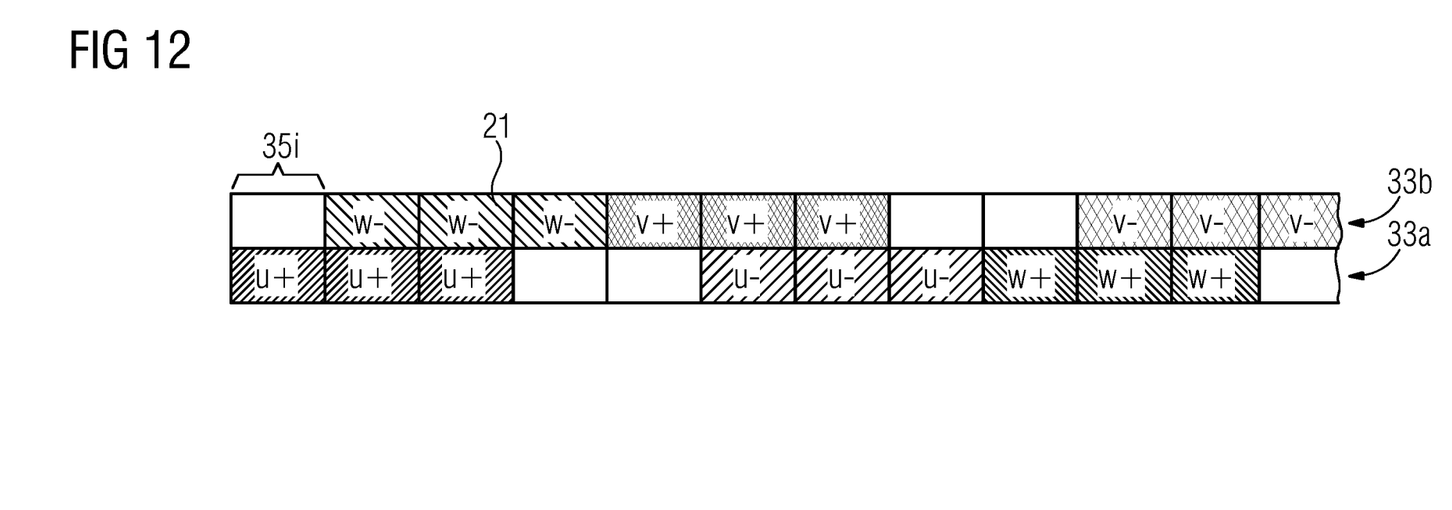
FIG. 12 shows a detail of a winding scheme of a stator winding according to a fifth exemplary embodiment.

FIGS. 10 to 12 show further exemplary variations of winding schemes for a corresponding 90° detail of the winding: FIG. 10 thus shows part of a winding scheme for a stator winding having six electrical phases u1, u2, v1, v2, w1 and w2. In order also to allow, for this increased phase number, a crossing-free configuration of the stator winding with individual coils situated next to one another and with short winding heads, by comparison with FIG. 9, the stator winding is distributed on double the number of winding layers. Correspondingly, a still higher number of unoccupied positions 41 is present (e.g., 75% of the available places). The unoccupied positions may be completely or partially occupied by filling elements (not shown here) and/or cooling ducts.

The above-described examples each relate to unchorded windings. In principle, however, stator windings according to the present embodiments may also be configured as chorded windings. This may be brought about in a similar manner to the prior art, for example, by an azimuthal offset between the winding layers and/or by a change in the zone width. FIG. 11 shows a corresponding chorded winding that emanates from the winding of FIG. 9 by an azimuthal offset of the individual occupied zones. This results in individual azimuthal positions in which (e.g., considered over a plurality of layers) an overlapping is present between the individual electrical phases, and results in other azimuthal positions that, considered over all layers, may be unoccupied. FIG. 12 shows another example of a chorded winding, in which the zones occupied by electrical phases are widened by comparison with the example of FIG. 9. This results in an increase in the filling factor of the winding in relation to the maximum 50% present in the scheme of FIG. 9.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A stator for an electric alternating current machine, the stator comprising:
a stator winding arranged about a central axis and comprising a plurality of conductor windings, wherein the plurality of conductor windings are grouped to form a plurality of electrical phases,
wherein the stator winding has a plurality of winding layers,
wherein the conductor windings of a phase of the plurality of electrical phases each have a plurality of axially oriented conductor limbs that are connected to one another in two axial end regions in pairs by two winding heads, with the result that a plurality of individual coils are formed for each phase of the plurality of electrical phases,
wherein, as viewed in a circumferential direction, the plurality of axially oriented conductor limbs of individual phases of the plurality of electrical phases follow one another in alternation in a uniform pattern,
wherein the two winding heads of a given individual coil of the plurality of individual coils extend within a winding layer of the plurality of winding layers, and
wherein a sequence of the plurality of axially oriented conductor limbs of the respective phases of the plurality of electrical phase and distribution of the individual coils on individual winding layers of the plurality of winding layers are chosen such that crossovers within the individual winding layers are avoided in a region of the two winding heads.

2. The stator of claim 1, wherein all individual coils of the plurality of individual coils are each situated completely within a respectively assigned winding layer.

3. The stator of claim 2, wherein, for each selected individual coil of the plurality of individual coils that is situated in an assigned winding layer, an axial limb of a respective individual coil overlaps in radial projection with an inner region of another individual coil of the plurality of individual coils that is arranged in another winding layer.

4. The stator of claim 1, wherein the stator winding is configured as an air gap winding.

5. The stator of claim 1, wherein the plurality of axially oriented conductor limbs of the plurality of individual coils are distributed over a regular occupancy pattern of radial and azimuthal positions.

6. The stator of claim 5, wherein a plurality of positions are unoccupied in the regular occupancy pattern.

7. The stator of claim 6, wherein coolant ducts are arranged in a region of the plurality of unoccupied positions.

8. The stator of claim 5, wherein at least one conductor limb of the plurality of axially oriented conductor limbs of the plurality of individual coils is positioned within each of the azimuthal positions of the regular occupancy pattern, respectively.

9. The stator of claim 8, wherein at least one of the radial positions within the respective azimuthal position of the regular occupancy pattern is unoccupied.

10. The stator of claim 1, wherein the stator winding has an even number of winding layers.

11. The stator of claim 10, wherein the even number of winding layers includes two or four winding layers.

12. The stator of claim 1, wherein the two winding heads are of U-shaped configuration.

13. The stator of claim 1, wherein the two winding heads have bending radii that lie in a range between 5 mm and 100 mm.

14. The stator of claim 1, wherein each individual coil of the plurality of individual coils is configured as a saddle-shaped flat coil.

15. The stator of claim 1, wherein the stator winding is configured as an unchorded winding.

16. The stator of claim 1, wherein the stator winding is configured as a chorded winding.

17. An electric alternating current machine comprising:
a stator for an electric alternating current machine, the stator comprising:
a stator winding arranged about a central axis and comprising a plurality of conductor windings, wherein the plurality of conductor windings are grouped to form a plurality of electrical phases,
wherein the stator winding has a plurality of winding layers,
wherein the conductor windings of a phase of the plurality of electrical phases each have a plurality of axially oriented conductor limbs that are connected to one another in two axial end regions in pairs by two winding heads, with the result that a plurality of individual coils are formed for each phase of the plurality of electrical phases,
wherein, as viewed in a circumferential direction, the plurality of axially oriented conductor limbs of individual phases of the plurality of electrical phases follow one another in alternation in a uniform pattern,
wherein the two winding heads of a given individual coil of the plurality of individual coils extend within a winding layer of the plurality of winding layers, and
wherein a sequence of the plurality of axially oriented conductor limbs of the respective phases of the plurality of electrical phase and distribution of the individual coils on individual winding layers of the plurality of winding layers are chosen such that crossovers within the individual winding layers are avoided in a region of the two winding heads.

18. The electric machine of claim 17, further comprising a rotor that is equipped with at least one superconducting excitation winding.

* * * * *